US006230858B1

(12) United States Patent
Moradmand et al.

(10) Patent No.: US 6,230,858 B1
(45) Date of Patent: May 15, 2001

(54) INTERNALLY SLOTTED ORIFICE DISC FOR LOW SPEED CONTROL IN AUTOMOTIVE DAMPERS

(75) Inventors: Jamshid Kargar Moradmand; Robert Alan Neal, both of Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/387,335

(22) Filed: Aug. 31, 1999

(51) Int. Cl.[7] .......................................... F16F 9/34
(52) U.S. Cl. .................. 188/322.13; 188/282.6; 188/322.14
(58) Field of Search ................. 188/322.13, 322.14, 188/322.15, 322.16, 322.22, 315, 283, 282.1, 282.8, 317, 318, 316, 282.5, 282.6

(56) References Cited

U.S. PATENT DOCUMENTS

| 2,717,058 |   | 9/1955  | Brundrett . |
|-----------|---|---------|-------------|
| 3,062,331 |   | 11/1962 | Wyman . |
| 3,889,787 |   | 6/1975  | Zehring et al. . |
| 3,945,474 |   | 3/1976  | Palmer . |
| 4,401,196 |   | 8/1983  | Grundei . |
| 4,610,332 | * | 9/1986  | Mourray .......................... 188/322.15 |
| 4,646,883 |   | 3/1987  | Tanaka . |
| 4,768,629 |   | 9/1988  | Wossner . |
| 4,775,038 |   | 10/1988 | Unnikrishan et al. . |
| 4,809,829 |   | 3/1989  | Hummel et al. . |
| 4,815,576 | * | 3/1989  | Tanaka .................................. 188/315 |
| 4,964,493 |   | 10/1990 | Yamaura et al. . |
| 4,971,181 |   | 11/1990 | Zaenglein et al. . |
| 5,148,897 | * | 9/1992  | Vanroye ........................... 188/322.22 |
| 5,577,579 |   | 11/1996 | Derr . |
| 5,738,190 |   | 4/1998  | Deferme . |
| 5,813,500 | * | 9/1998  | Deferme ........................... 188/322.22 |
| 5,921,360 | * | 7/1999  | Moradmand ..................... 188/322.22 |

FOREIGN PATENT DOCUMENTS 2234038   1/1994  (GB) .

* cited by examiner

Primary Examiner—Robert J. Oberleitner
Assistant Examiner—Melanie Talavera
(74) Attorney, Agent, or Firm—Robert M. Sigler

(57) ABSTRACT

A valve assembly for a fluid vehicle damper having a cylinder with a valve body is provided. The valve body has an outer surface adjacent to an interior wall of the cylinder and includes first and second opposing surfaces. The valve body defines first and second fluid chambers within the damper, which are adjacent to the first and second surfaces, respectively. Inner and outer annular seats extend from the first surface and define an annular channel therebetween. At least one fluid passageway is connects the annular channel and second surface for providing fluid communication therebetween. A high speed bypass valve assembly is attached to the valve body and is movable between an open position and a closed position adjacent to the annular seats. An orifice disc is interposed between the annular seats and the high speed bypass valve assembly for providing low speed bypass of fluid from the second chamber to the first chamber when the high speed bypass valve assembly is in the closed position. The orifice disc has at least one opening therethrough defined by a contiguous perimeter. The outer annular seat segments the at least one opening into inner and outer passageways. When the damper undergoes low speed movement, fluid flows from the second chamber through the at least one fluid passageway into the annular channel, through the inner passageway around the outer annular seat, and out the outer passageway to the first chamber.

11 Claims, 4 Drawing Sheets

US 6,230,858 B1

INTERNALLY SLOTTED ORIFICE DISC FOR LOW SPEED CONTROL IN AUTOMOTIVE DAMPERS

RELATED APPLICATIONS

This application is related to Applicants' co-pending application entitled "Digressive Base Valve for Automotive Damper" having attorney docket no. H-201579 filed on the same date as the present application. Each application is directed to a different invention.

TECHNICAL FIELD

This invention relates to fluid dampers for vehicles, and more specifically, to an orifice disc for use as a low speed bypass valve in a valve assembly.

BACKGROUND OF THE INVENTION

Fluid vehicle dampers, such as hydraulic shock absorbers and struts, provide a smooth ride by absorbing forces that are generated by an uneven road surface. Two common types of vehicle fluid dampers are monotube and twin tube shock absorbers, each of which have a cylinder and piston. Twin tube shock absorbers have a valve body located at an end of the piston, commonly referred to as a piston valve, and at a cylinder end, commonly referred to as a base valve. The piston valve moves toward the base valve during compression of the shock absorber and moves away from the base valve during rebound. The valve bodies divide the shock absorbers into several fluid chambers and regulate the flow of fluid from one chamber to another thereby achieving particular ride handling characteristics. Typically, each valve body has a compression and rebound valve assembly located on opposing surfaces of the valve body that regulate fluid flow during the compression and rebound strokes. By modifying the valve assemblies, the ride handling characteristics may be calibrated.

Typically, it may be desirable to have a low speed bypass valve and a high speed bypass valve as part of a valve assembly to provide different degrees of damping depending on the speed at which the shock absorber compresses or rebounds. The valve bodies have inner and outer annular seats that coact directly or indirectly with adjacent low and high speed bypass valves. During low speed movement of the piston, such as vehicle cornering maneuvers, fluid only flows past the low bypass valve while the high bypass valve remains closed. Thus, the low speed bypass valve provides a rate of damping. One prior art low speed bypass valve has incorporated a solid disc-shape structure in abutting relation with the annular seats. The annular seats are coined to form notches through which the fluid may flow during low speed movement of the piston. However, the coining operation requires a library of precision tools to form the notches, which adds cost to the low speed bypass valve. Another prior art low speed bypass valve has incorporated a disc having notches at the perimeter of the disc adjacent to the outer annular seat. When the disc is adjacent to the annular seats, the fluid only flows through the notches in the disc during low speed movement of the piston. However, this type of disc tends to fatigue over time. Therefore, what is needed is a robustly designed low speed bypass valve that is inexpensive.

SUMMARY OF THE INVENTION

The present invention provides a fluid vehicle damper having a cylinder with a valve body. The valve body includes an outer surface adjacent to an interior wall of the cylinder and includes first and second opposing surfaces. The valve body defines first and second fluid chambers within the damper, which are adjacent to the first and second surfaces, respectively. Inner and outer annular seats extend from the first surface and define an annular channel therebetween. At least one fluid passageway is disposed between the annular channel and second surface for providing fluid communication therebetween. A high speed bypass valve assembly is attached to the valve body and is movable between an open position and a closed position adjacent to the annular seats. An orifice disc is interposed between the annular seats and the high speed bypass valve assembly for providing low speed bypass of fluid from the second chamber to the first chamber when the high speed bypass valve assembly is in the closed position. The orifice disc has at least one opening therethrough defined by a contiguous perimeter. The outer annular seat segments the opening into inner and outer passageways. When the damper undergoes low speed movement, fluid flows from the second chamber through the fluid passageway into the annular channel, through the inner passageway around the outer annular seat, and out the outer passageway to the first chamber.

Accordingly, the present invention provides a low speed bypass valve that obviates the need for a coining operation and provides a disc that has an improved fatigue life.

DESCRIPTION OF THE PREFERRED EMBODIMENT

Figure 1:
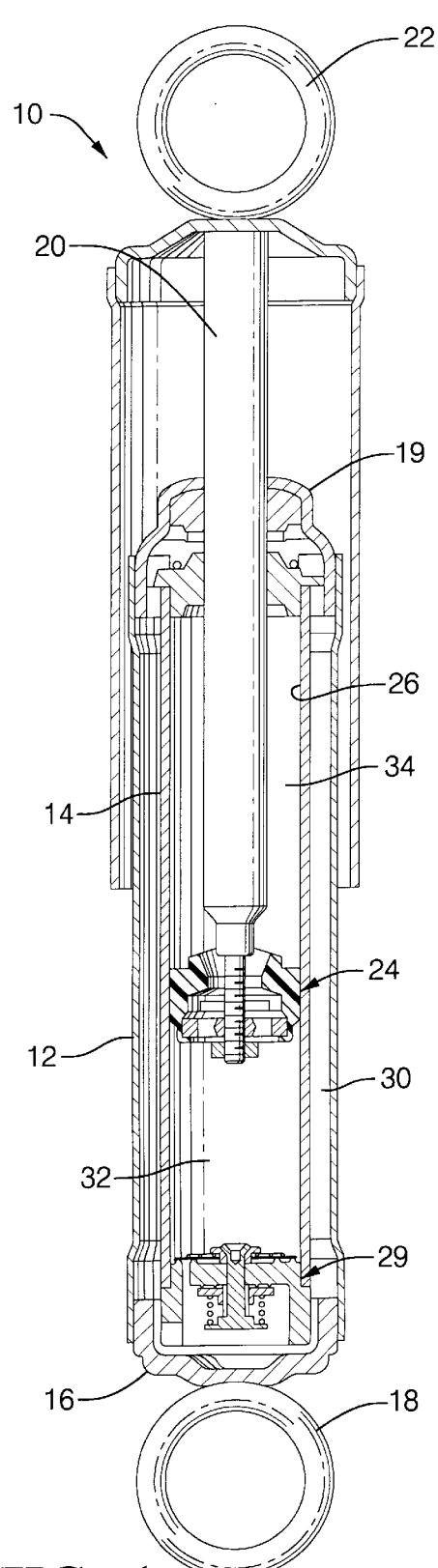
FIG. 1 is a cross-sectional view of a fluid vehicle damper according to the present invention.

A fluid vehicle damper or, more specifically, a twin tube shock absorber is generally shown at 10 in FIG. 1. Although a twin tube shock is shown, the present invention is equally applicable to mono-tube shocks or struts. The damper 10 has a reservoir tube 12 and a cylinder 14 disposed within the reservoir tube 12. A lower portion 16 of the reservoir tube 12 has a lower connection 18 for attachment to a suspension component (not shown). An upper portion 19 of the reservoir tube 12 slidably receives a piston rod 20 to which an upper connection 22 is attached. The upper connection 22 is typically attached to a portion of the vehicle's frame (not shown). The suspension component (not shown) moves relative to the frame (not shown) as the vehicle travels over uneven road surfaces thereby moving the piston rod 20 within the cylinder 14.

A piston valve assembly is schematically shown at 24 and is attached to the rod 20 opposite the upper connection 22. An interior wall 26 of the cylinder 14 slidably receives the piston valve assembly 24. A base valve assembly 29 is secured to an end 27 of the cylinder 14 and abuts the lower portion 16. The base valve assembly 29 separates the cylinder 14 from the reservoir tube 12 and defines a first fluid chamber, or reservoir chamber 30, and a second fluid chamber, or compression chamber 32. The base valve assembly 29 has a base valve body 31 that includes a downwardly depending annular flange 33 with a plurality of notches 35 (best shown in FIG. 2) that permit fluid to flow uninhibited between the reservoir 30 and compression 32 chambers. The base valve body 31 is typically formed from powdered metal. The piston valve assembly 24 separates the compression chamber 32 from a rebound chamber 34. Hydraulic fluid in the chambers 30, 32, 34 dampens forces as the fluid passes through the piston 24 and base 29 valve assemblies and their associated valve assemblies, which are discussed in more detail below. The base valve assembly 29 primarily controls the compression characteristics of the damper 10, while the piston valve assembly 24 primarily controls the rebound characteristics of the damper 10.

Figure 2:
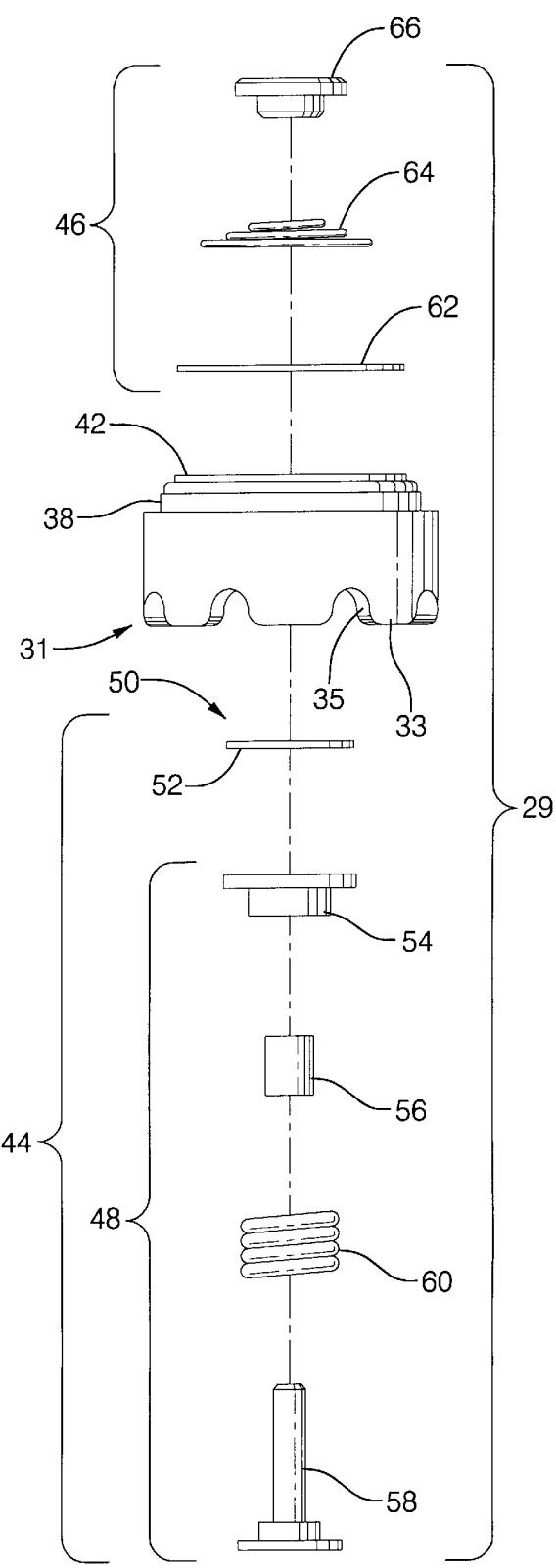
FIG. 2 is an exploded view of a valve assembly shown in FIG. 1.

Although the present invention may be used with the piston valve assembly 24, as would be appreciated by an ordinary worker, it will be discussed in the context of the base valve assembly 29. The valve body 31 includes an outer surface 38 adjacent to the interior wall 26 of the cylinder 14 and includes first 40 and second 42 opposing surfaces. The reservoir chamber 30 and compression chamber 32 are adjacent to the first 40 and second 42 surfaces, respectively. Referring to FIG. 2, the base valve assembly 29 includes a compression valve assembly 44 that regulates the flow of fluid from the compression chamber 32 to the reservoir chamber 30 during compression of the damper 10 and is the primary control of damping during compression. The base valve assembly 29 also includes a rebound valve assembly 46 that regulates the flow of fluid from the reservoir chamber 30 to the compression chamber 32 during rebound of the damper 10. As is well known in the art, fluid flow in and out of reservoir chamber 30 is caused by the differing rates of volume change in compression chamber 32 and rebound chamber 34 as rod 20 moves in and out of rebound chamber 34.

The compression valve assembly 44 includes a high speed bypass valve assembly 48 and low speed bypass valve assembly 50. The high speed bypass valve assembly 48 provides high speed damping and includes a blow-off valve 54, a spacer sleeve 56, and a spring 60, which are secured to the base valve body 31 by a connector 58. The connector 58 may be a rivet as shown or any suitable fastening device. The rivet 58 is received in a central bore 67 (shown in FIGS. 3–5) in the valve body 31. The high speed bypass valve assembly 48 is discussed in greater detail below. The low speed bypass valve assembly 50 has an orifice disc 52 which works in conjunction with the valve body 31 to provide low speed damping. The orifice disc 52 is typically made from a high strength spring steel. It is to be understood that a different type of high speed bypass valve may be used other than the one depicted in the Figures. Further, it will be appreciated that the orifice disc 52 may be used in conjunction with other discs.

The rebound valve assembly 46 has a rebound disc 62 adjacent to the second surface 42. The rebound disc 62 is biased toward the second surface 42 by a coil spring 64 which is secured to the valve body 31 by a retainer 66 and the rivet 58. The rebound valve assembly 46 permits fluid to flow from the reservoir chamber 30 to the compression chamber 32 at a predetermined rate.

Figure 3:
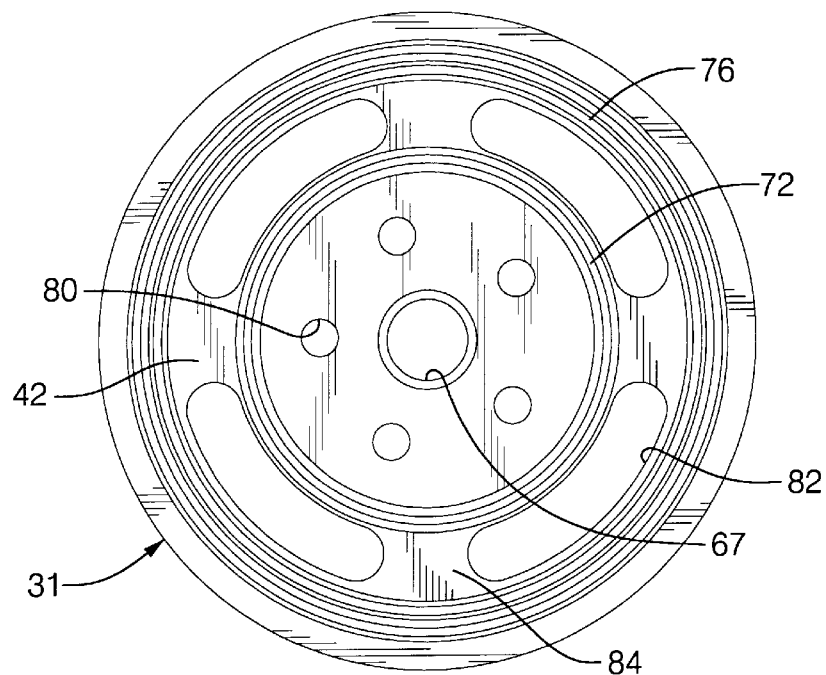
FIG. 3 is a bottom elevational view of a cylinder end shown in FIG. 2.
Figure 4:
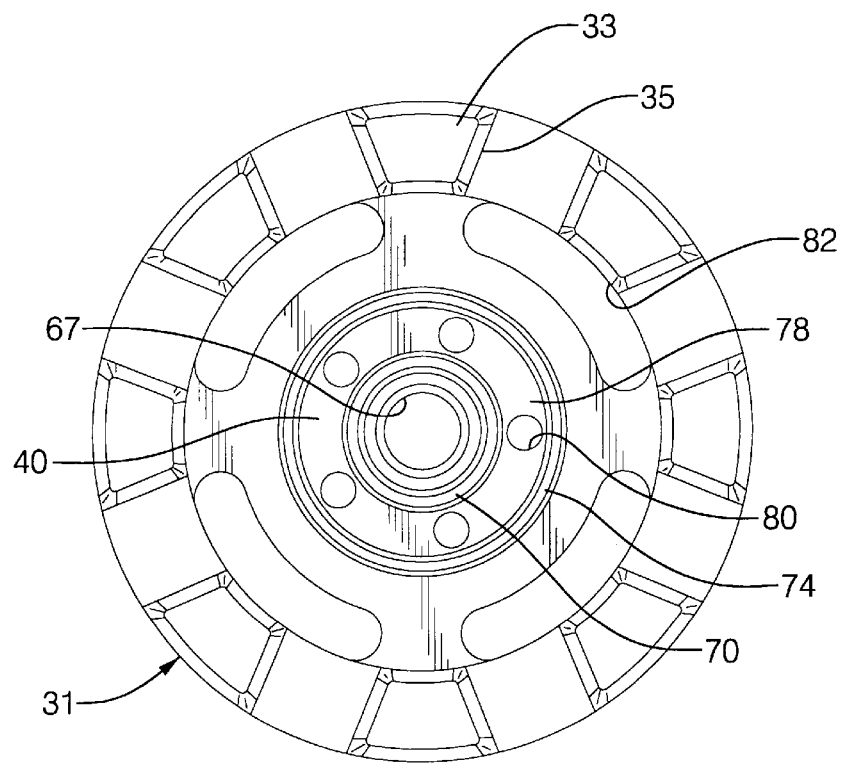
FIG. 4 is a top elevational view of the cylinder end shown in FIG. 3.

Referring now to FIGS. 3 and 4, the first 40 and second 42 surfaces of the valve body 31 have inner 70, 72 and outer 74, 76 annular seats, respectively, for sealing engagement with the discs 52, 62, respectively. The inner 70 and outer 74 annular seats extend from the first surface 40 and define an annular channel 78 therebetween. At least one fluid passageway 80 connects the annular channel 78 and second surface 42 for providing fluid communication therebetween during compression of the damper 10. Preferably, the valve body 31 has a plurality of the fluid passageways 80 spaced radially about the bore 67. The fluid passageways 80 may have a circular cross-section as shown, or any other suitable cross-section, such as an arcuate cross-section.

The valve body 31 also has rebound fluid passageways 82 connecting the first 40 and second 42 surfaces for providing fluid communication therebetween during rebound of the damper 10. The rebound passageways 82 are spaced radially about the bore 67 and are interposed between the inner 72 and outer 76 annular seats, which define a rebound annular channel 84. These passageways permit fluid to move from the reservoir chamber 30 back to the compression chamber 32 after compression, which is discussed in more detail below.

Figure 5:
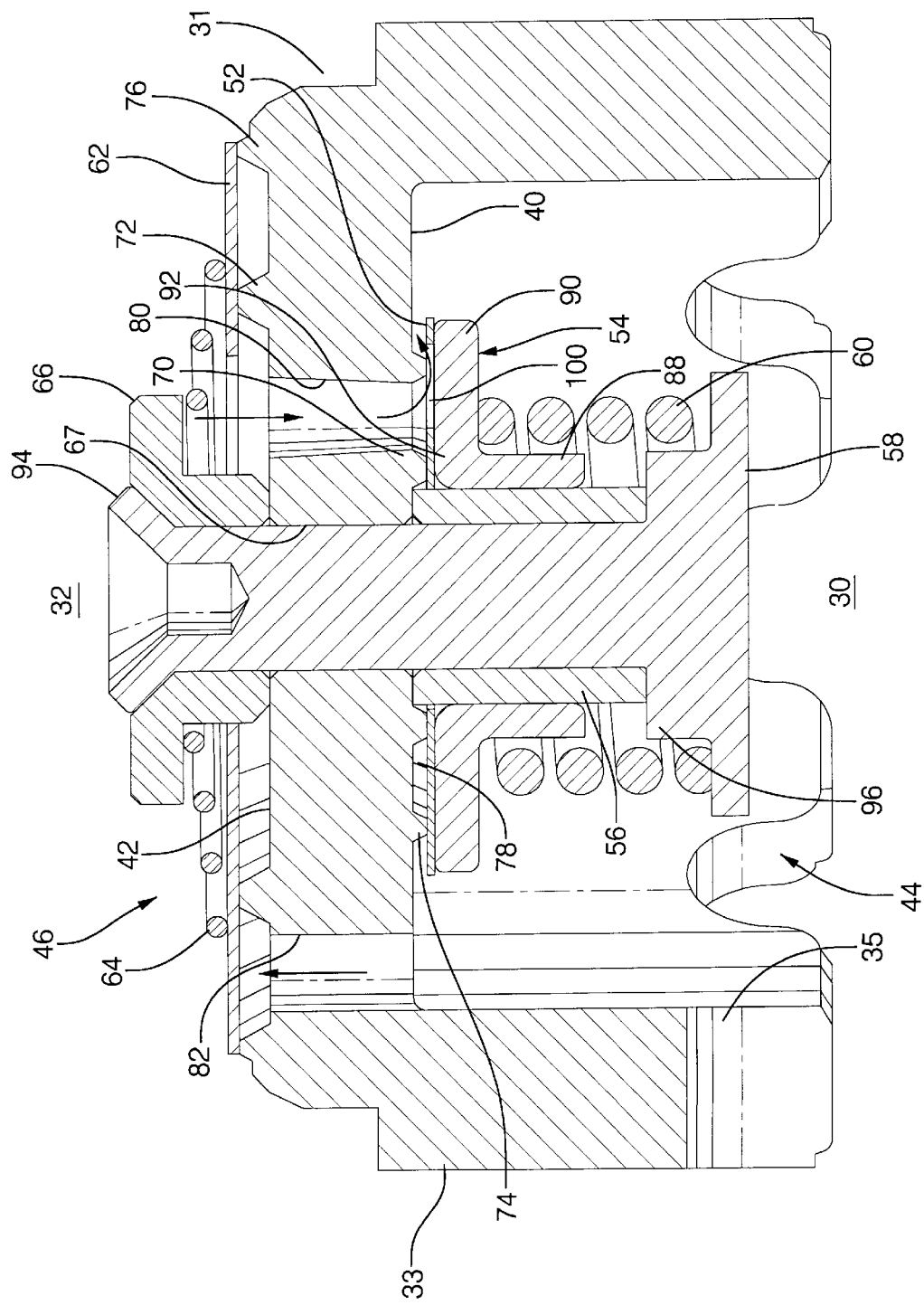
FIG. 5 is an enlarged cross-sectional view of the valve assembly of FIG. 1 shown in the closed position.

Referring to FIG. 5, the high speed bypass valve assembly 48 is movable between an open position, which is in spaced relation from the first surface 40 and abuts the back end of the rivet 58, and a closed position adjacent to the annular seats 70, 74, as shown in the Figures. The blow-off valve 54 has a hollow cylindrical portion 88 with a flange 90 extending transversely from an end 92 thereof. The blow-off valve 54 may be manufactured from steel, powdered metal or any other suitable material. The rivet 58 is partially disposed within the bore 67 and the cylindrical portion 88 for securing the blow-off valve 54 to the valve body 31. Specifically, an end 94 adjacent to the retainer 66 is deformed to secure the compression 44 and rebound 46 valve assemblies to the valve body 31. The spring 60 is interposed between the rivet 58 and the flange 90 for biasing the blow-off valve to the closed position. The cylindrical spacer sleeve 56 is disposed within the hollow cylindrical portion 88 and abuts a shoulder 96 on the rivet 58 and the first surface 40. The spacer sleeve 56 provides a bearing surface for the blow-off valve 54 as it moves between the open and closed positions.

Figure 6:
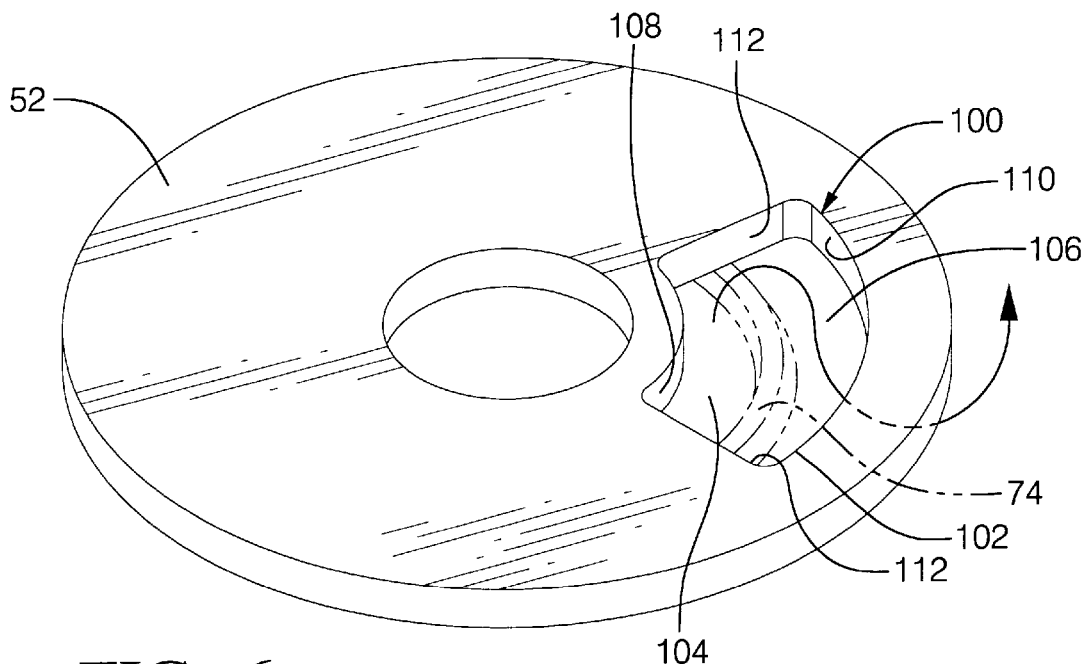
FIG. 6 is a perspective view of a portion of the valve assembly of FIG. 2 shown in a closed position.

The orifice disc 52 is interposed between the annular seats 70, 74 and the high speed bypass valve assembly 48 for providing low speed bypass of fluid from the compression chamber 32 to the reservoir chamber 30 when the blow-off valve 54 is in the closed position. Referring to FIG. 6, the orifice disc 52 has at least one opening 100 therethrough defined by a contiguous perimeter 102. The contiguous perimeter 102 of the opening 100 is defined by inner 108 and outer 110 arcuate walls connected by opposing side walls 112. The outer annular seat 74 segments the opening 100 into inner 104 and outer 106 passageways. When the damper 10 undergoes a low speed compression, fluid flows from the compression chamber 32 through the fluid passageways 80 into the annular channel 78, through the inner passageway 104 around the outer annular seat 74, and through the outer passageway 106 to the reservoir chamber 30. In this manner, low speed damping is provided.

Figure 7:
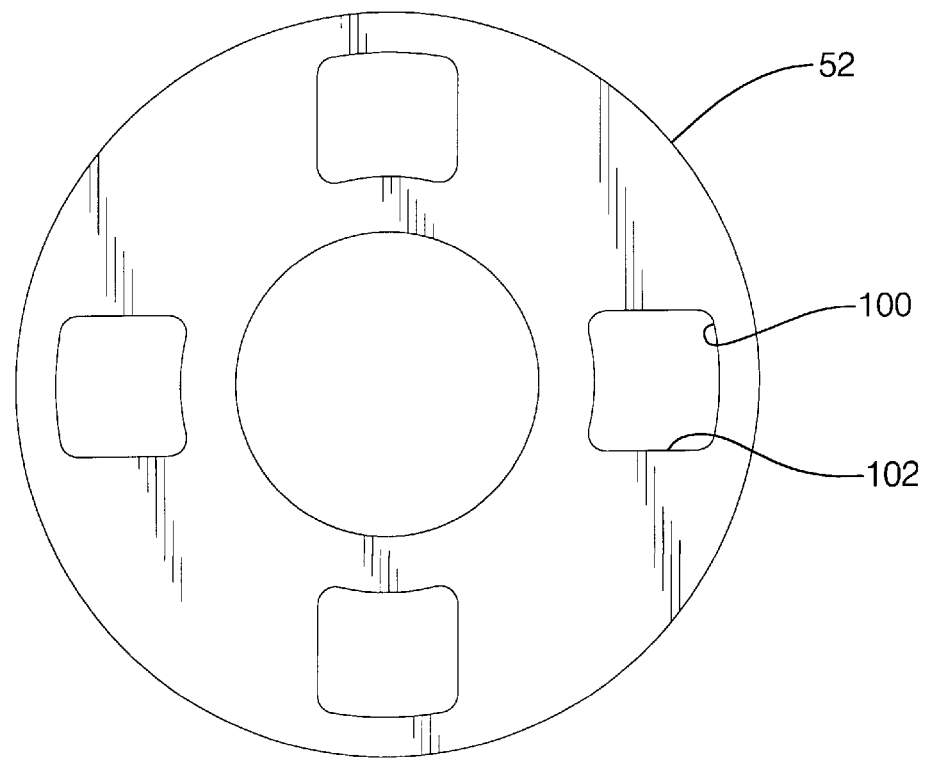
FIG. 7 is a top elevational view of an orifice disc shown in FIG. 2 according to the present invention.

Preferably, the orifice disc 52 abuts the annular seats 70, 74 and the flange 90 when the blow-off valve 54 is in the closed position. In an alternative embodiment, shown in FIG. 7, the opening 100 comprises a plurality of openings, preferably four openings, spaced radially about the orifice disc 52.

In operation, during low speed compression, such as a vehicle cornering maneuver, fluid flows from the compression chamber 32 through the fluid passageways 80, into the annular channel 78, through the inner passageway 104 around the outer annular seat 74, and through the outer passageway 106 to the reservoir chamber 30, as shown by the arrows in FIGS. 5 and 6. During low speed rebound, fluid returns to the compression chamber 32 through the rebound passageways 82, shown by the arrow in FIG. 5, by deflecting the rebound disc 62 and permitting fluid to flow past the outer annular seat 76. In operation, during high speed compression, such as travelling over a pot hole in a road at relatively high vehicle speeds, the spring 60 is compressed by the high forces of the fluid against the orifice disc 52, which moves the blow-off valve 54 to the open position. In the open position, the fluid may flow rapidly from the compression chamber 32 to the reservoir chamber 30 through the fluid passageways 80. Similarly during high speed rebound, the coil spring 64 becomes compressed by the high forces of the fluid against the rebound disc 62, thereby permitting a high rate of fluid flow from the reservoir chamber 30 to the compression chamber 32 through the rebound passageways 82.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A valve assembly for a fluid vehicle damper comprising:

a cylinder having an interior wall;

a valve body having an outer surface and first and second opposing surfaces, said valve body disposed at least partially within said cylinder with at least a portion of said outer surface adjacent to said interior wall, and said valve body defining first and second fluid chambers adjacent to said first and second surfaces respectively;

inner and outer annular seats extending from said first surface defining an annular channel therebetween;

at least one fluid passageway connecting said annular channel and said second surface for providing fluid communication therebetween;

a high speed bypass value assembly attached to said valve body and movable between an open position and a closed position adjacent to said annular seats; and an orifice disc interposed between said annular seats and said high speed bypass valve assembly for providing low speed bypass of fluid from said second chamber to said first chamber with said high speed bypass valve assembly in said closed position, said orifice disc having at least one opening therethrough defined by a contiguous perimeter, said outer annular seat segmenting said at least one opening into inner and outer passageways, wherein fluid flows from said second chamber through said at least one fluid passageway into said annular channel through said inner passageway around, said outer annular seat and out said outer passageway to said first chamber.

2. The valve assembly as set forth in claim 1 wherein said cylinder further includes an end and said valve body is secured to said end.

3. The valve assembly as set forth in claim 2 wherein said high speed bypass valve assembly and said orifice disc form a compression valve assembly for permitting fluid to move from said second chamber to said first chamber during compression of said fluid vehicle damper.

4. The valve assembly as set forth in claim 3 wherein said valve body includes a central bore located interiorly of said inner annular seat, and wherein said high speed bypass valve assembly includes a blow-off valve having a hollow cylindrical portion with a flange extending transversely from an end thereof with said flange adjacent to said orifice disc, a connector partially disposed within said bore and said cylindrical portion for securing said blow-off valve to said valve body, and a spring interposed between said connector and said blow-off valve for biasing said blow-off valve to said closed position.

5. The valve assembly as set forth in claim 4 wherein said orifice disc abuts said annular seats in said closed position.

6. The valve assembly as set forth in claim 5 wherein said orifice disc abuts said flange in said closed position.

7. The valve assembly as set forth in claim 4 wherein said high speed bypass valve assembly further includes a cylindrical spacer sleeve disposed within said hollow cylindrical portion interposed between said connector and said blow-off valve.

8. The valve assembly as set forth in claim 4 wherein said at least one fluid passageway comprises a plurality of fluid passageways spaced radially about said bore.

9. The valve assembly as set forth in claim 1 wherein said contiguous perimeter of said at least one opening is defined by inner and outer arcuate walls connected by opposing side walls.

10. The valve assembly as set forth in claim 9 wherein said at least one opening comprises a plurality of openings spaced radially about said orifice disc.

11. The valve assembly as set forth in claim 10 wherein said plurality of openings comprises four openings.

* * * * *